United States Patent [19]

Ribier et al.

[11] 4,215,080
[45] Jul. 29, 1980

[54] LIQUID COLLECTING DEVICE AND USE THEREOF IN LIQUID-GAS CONTACTING APPARATUS

[75] Inventors: Jean G. Ribier; Maurice J. Dorsemaine; Bernard J. Sauvage, all of Brussels, Belgium

[73] Assignee: Hamon-Sobelco, S.A., Brussels, Belgium

[21] Appl. No.: 944,178

[22] Filed: Sep. 20, 1978

[30] Foreign Application Priority Data

Oct. 26, 1977 [FR] France .................................. 77 32243

[51] Int. Cl.² .................................................. F28C 1/06
[52] U.S. Cl. ...................................... 261/111; 261/112; 261/DIG. 11
[58] Field of Search ................................. 261/110–112, 261/DIG. 11; 165/DIG. 1

[56] References Cited

U.S. PATENT DOCUMENTS

| | | | |
|---|---|---|---|
| 1,715,253 | 5/1929 | Sperr, Jr. ................................ | 261/111 |
| 2,606,750 | 8/1952 | Jacir ................................ | 261/DIG. 11 |
| 2,612,359 | 9/1952 | Simpson ........................ | 261/DIG. 11 |
| 3,081,987 | 3/1963 | Meek et al. ..................... | 261/DIG. 11 |
| 4,130,613 | 12/1978 | Hovrai ........................... | 261/DIG. 11 |

FOREIGN PATENT DOCUMENTS

| | | | |
|---|---|---|---|
| 2547719 | 10/1975 | Fed. Rep. of Germany ... | 261/DIG. 11 |
| 876525 | 11/1942 | France ............................. | 261/DIG. 11 |
| 2262789 | 10/1976 | France ............................. | 261/DIG. 11 |

*Primary Examiner*—Frank W. Lutter
*Assistant Examiner*—Gregory N. Clements
*Attorney, Agent, or Firm*—Harold L. Stowell

[57] ABSTRACT

A liquid collecting device comprises a liquid collecting trough, an inclined wall extending above the trough for directing generally vertically falling liquid into the trough and a panel composed of a plurality vertically directed intersecting walls positioned a small distance above a major portion of the inclined wall. The collecting device has particular utility liquid-gas contacting apparatus.

3 Claims, 4 Drawing Figures

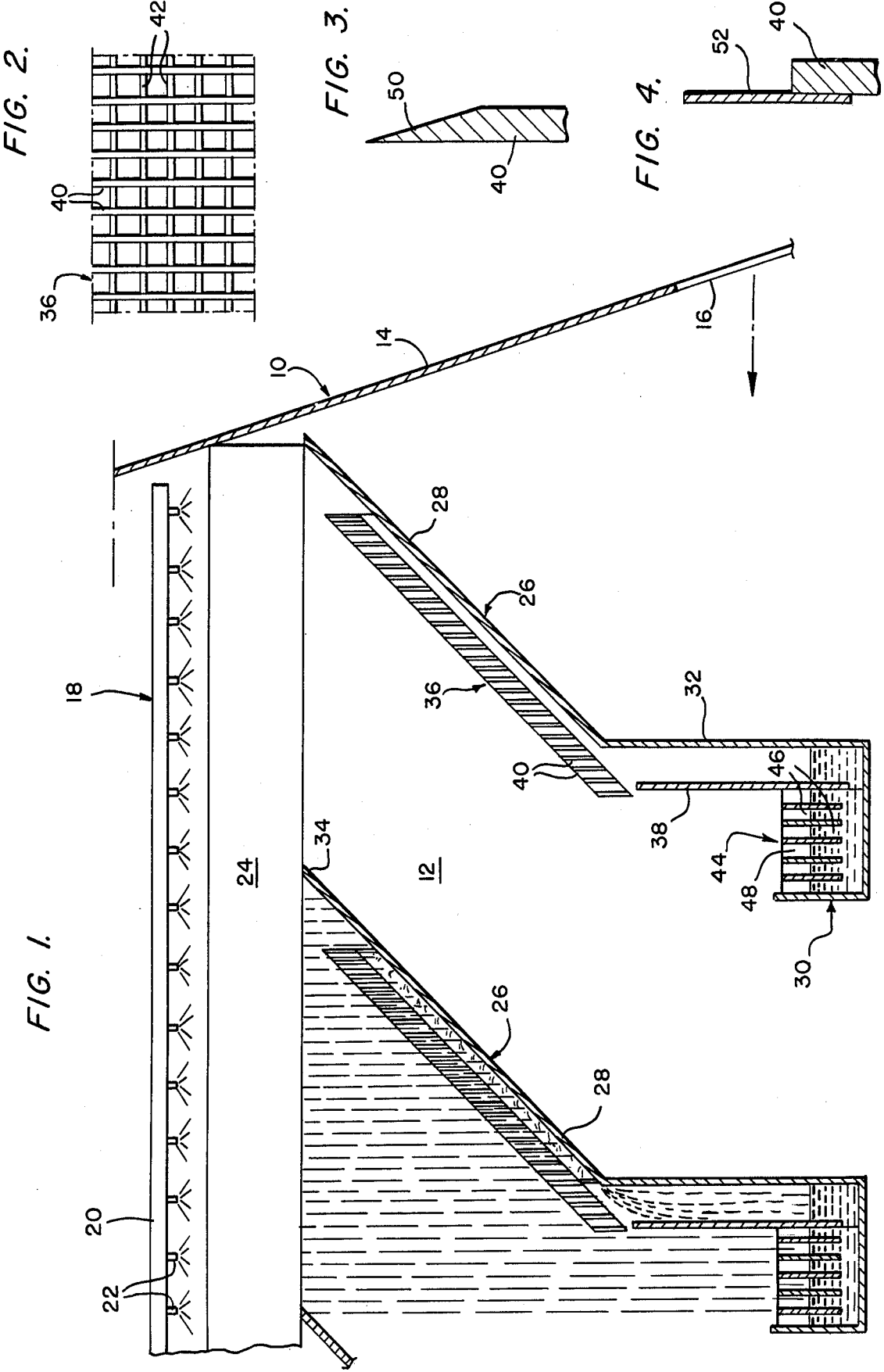

LIQUID COLLECTING DEVICE AND USE THEREOF IN LIQUID-GAS CONTACTING APPARATUS

BRIEF SUMMARY OF THE INVENTION

The present invention relates to a device for receiving a freely falling liquid such as a shower or the like and also relates to use of such devices in installations for contacting a liquid with a gas, in particular, those employed for cooling a liquid such as water by a moving air stream.

Installations for contacting a liquid with a gas generally comprise a chamber or tower provided in its lower part with at least one gas inlet opening and in its upper part at least one gas outlet opening. Within the chamber are provided, in superimposed relation, a liquid distributing system; a unit for directly contacting the liquid from the distributing system with an upwardly flowing gas stream and means for receiving the liquid which falls freely in the form of a shower or the like from the contacting unit. The liquid receiving means may be formed by a tray or pond which is provided at the base of the chamber and into which the liquid falls. However, such a tray or pond has drawbacks in that it is of relatively costly construction, produces considerable noise due to the impact of the falling liquid from the contacting unit onto the liquid within the tray and requires high pumping power for directly or indirectly recycling the liquid from the tray to the distributing system.

In an effort to overcome these drawbacks, it is known, in particular, from French Pat. No. 876,525, M. Maurice Hamon, dated Aug. 3, 1942, to employ liquid-receiving devices which are disposed immediately below the gas and liquid contact unit. The liquid-receiving device comprises, in one form of the invention, a wall inclined to the vertical and a trough extending along the lower edge of the wall. These devices are disposed parallel to each other and overhang each other to prevent any fall of the liquid from the heat exchange unit directly to the base of the tower.

However, these receiving devices of the prior French Pat. No. 876,525 are not fully satisfactory since the droplets of liquid which strike against the walls burst upon contact with the wall and produce excessive noise and result in splashes which to a large extent fall out of the troughs and consequently require the presence of a tray at the base of the chamber.

An object of the present invention is to overcome these drawbacks by providing a liquid-receiving device which ensures that the liquid splashes do not leave the troughs and consequently enables the tray at the base of the chamber to be dispensed with and at the same time attenuates the noise produced by the liquid striking against the wall of the receiving devices.

According to the invention, there is provided a device for receiving a freely falling liquid in the form of a shower or the like, of the type comprising a wall inclined to the vertical and a trough extending along the lower edge of the wall, the device comprising a panel for trapping the liquid splashes disposed at a small height above the inclined wall and covering at least the major part of the surface thereof, the panel being formed by partition walls defining therebetween passages which are open at the upper and lower ends and closed in the direction of the greatest slope of the inclined wall.

According to the invention, there is also provided an installation for contacting a liquid with a gas, comprising a chamber provided in its lower part with at least one inlet opening for the gas and in its upper part with at least one outlet opening for the gas and, within the chamber in superposed relation, a liquid-distributing system, a unit for directly contacting the liquid with the gas stream flowing therethrough and liquid-receiving devices, such as defined hereinbefore, disposed below gas and liquid contact unit for receiving the liquid which flows therefrom.

BRIEF DESCRIPTION OF THE DRAWING

Further features and advantages of the invention will be apparent from the ensuing description with reference to the accompanying drawing which is given solely by way of example and in which:

FIG. 1 is a fragmentary, diagrammatic, elevational and sectional view of an installation for contacting a liquid with a gas equipped with liquid-receiving devices according to the invention;

FIG. 2 is a plan view of a trapping panel provided with the liquid-receiving devices shown in FIG. 1;

FIG. 3 is an elevational and sectional view of the upper edge portion of a partition wall of the panel shown in FIG. 2, and FIG. 4 is a view similar to FIG. 3 of a modification of the upper edge portion of a partition wall.

Reference will now be made to FIG. 1 which shows partly and diagrammatically an installation for contacting a liquid with a gas formed, in the illustrated embodiment, by an atmospheric cooling tower 10. This tower 10 comprises a chamber 12 defined by a wall 14 at the base of which there is provided air inlet opening 16.

Disposed in the chamber 12 is a liquid, such as water, distributing system 18. The liquid distributing system is of conventional design and includes a plurality pipes 20, each provided with a plurality of outlet nozzles 22.

The outlet nozzle sprays the water to be cooled onto a unit 24 for directly contacting the water with the air stream flowing through the chamber 12. This unit 24 may be of any of the well-known types employing splashing or running of a liquid over wood or plastic surfaces. Disposed immediately under the unit 24 are devices 26 adapted to receive the water falling freely in the form of a shower or the like from the lower part of the contact unit 24.

Each of these receiving devices 26 comprises a wall 28 inclined to the vertical and a trough 30 connected to the lower edge of the inclined wall 28 by a vertical wall 32. The receiving device 26 described up to this point is conventional and is of a type similar to that disclosed in the aforementioned French Pat. No. 876,525. The receiving devices 26 are arranged to be parallel and slightly overhang each other, that is to say, the upper edge 34 of the wall 28 of each receiving device is disposed in vertical alignment with the trough 30 of the immediately adjacent receiving device so as to avoid any direct fall of the water from the unit 24 to the base of the chamber 12.

According to the invention, the receiving device 26 further comprises a panel 36 for trapping liquid splashes disposed at a small height above the wall 28 and covering the major part of the surface of the latter. This panel 36 also extends beyond the lower edge of the wall 28 above a portion of the trough 30. The assembly also includes a substantially vertical disposed deflecting plate 38 extending between the lower edge of the panel 36 and a region at a short distance from the bottom of the trough 30. As can be seen in FIG. 2, the panel 36 is formed by a cross system of longitudinal partition walls 40 which extend substantially parallel to the length of the trough 30 and trasverse partition walls 42 which extend substantially normal to partitions 40.

Further, the partition walls 40 and 42 are oriented substantially vertically in height so as to define therebetween passages which are open top and bottom in the vertical direction. The panel 36 may be fixed above the wall 28 by any suitable means, for example, by feet which are screwed or otherwise fixed to the panel 36 and to the wall 28. The device is completed by a panel 44 which is similar to the panel 36 and is composed of cross partition walls 46 and 48. Panel 44 is disposed in the trough 30 and has for its function trapping of the splashes produced by the water falling directly from the unit 24 into the trough 30.

In operation, the water issuing from the sprays 22 onto the gas-liquid contact apparatus 24 is cooled by the direct contact with the air of the atmosphere which enters by way of the air inlet opening 16 and escapes by way of an air outlet opening (not shown) provided in the upper part of the chamber 12. After having passed through the unit 24, a part of the water which falls in the form of a shower or the like strikes against the walls 28 of the receiving devices whereas another part of this water is received directly in the troughs 30. The water droplets which fall onto the walls 28 after having passed through the vertical passages of the panel 36 burst upon contact with the wall 28 and produce splashes. However, these splashes generally do not produce any projection of droplets beyond the free outer edge of the trough 30 since they are trapped by the partition walls 40 and 42 which preclude any direct passage of droplets through the panel 36 after rebounding from the wall 28. Consequently, the water received on the wall 28 flows along the latter down to its lower edge after which it falls freely into the trough 30. In the course of this fall, the water which flows from the wall 28 is prevented from spurting beyond the free outer edge of the trough 30 by the vertical deflecting plate 38. Thus, it is found that all the water which falls onto the wall 28, or directly into the space between the wall 32 and the deflecting plate 38, is received in the trough 30 without producing splashes liable to fall to the base of the chamber between the troughs of neighboring devices 26. Moreover, the splashes due to the water which falls directly into the troughs 30 are also trapped in the latter by the panels 46-48 which perform a function similar to that of the panels 36.

Further, it will be observed that in addition to the function of trapping the water splashes, the panel 36 also forms a sound trap and thus helps to reduce the sound level radiated to the exterior of the cooler by way of its air inlet opening 16.

It will be understood that, if the panel 36 is to perform its function effectively, the water must not burst on the upper edge portions or edges of the partition walls 40 and 42, otherwise it would produce splashes liable to fall outside the troughs 30. To avoid such a drawback, the upper edge portions 50 of the partition walls may have a tapered profile, as shown in FIG. 3, or may be extended on the side thereof remote from the wall 28 by a very thin strip 52. FIG. 4. Generally, the thickness of the edge defined by the tapered end 50 of the partition walls or by the strip 52 preferably should not exceed a few tenths of a millimeter, for example 3/10 of a millimeter.

Thus, it is clear that the liquid-receiving devices according to the invention completely or substantially eliminate the projection of liquid to the base of the chamber. Consequently, it is no longer necessary to provide at the base of the chamber a very deep and fluidtight tray, and it is even possible to eliminate such a tray, thereby reducing the pumping power required for directly or indirectly recycling the water received to the distributing system 18. Another advantage of the receiving devices according to the invention is that they permit very good circulation of air through the installation. Indeed, it has been found that this good circulation was obtained with an inclination of the wall 28 of the order of 45° to the horizontal and with panels 36 having a height of about 10 cm and positioned above wall 28. With receiving devices of the prior art, such an inclination would produce so much splashing that they are incapable of operating. Owing to the presence of the trapping panel 36, the invention is able to conciliate the requirement of optimum inclination of the wall 28 with the absence of the undesired splashing of the liquid.

It must be understood that the invention is not limited to the embodiment described hereinbefore, and many modifications may be made therein without department from the scope of the invention as defined in the claims. Thus, for example, the panel 36 is not necessarily formed by a system of intercrossing partition walls 40 and 42; it may be formed merely by a series of planar longitudinal partition walls which extend substantially parallel to the trough 30. The panel 36 may also be so designed that the partition walls define a honeycomb or like structure. Instead of being vertical, these partition walls may be slightly inclined, which would improve the soundtrapping qualities of the panel.

Furthermore, note that the panels 28 and 32 and the trough 30 may be made from any suitable material, such as concrete, plastics material, asbestos-cement, etc. They are preferably made in a single piece. The panel 36 may be of the same materials, but preferably of a lightweight material and it may be made by any conventional manufacturing method, such as, for example, the moulding of plastics material.

What we claim is:

1. A device for placing a liquid in contact with a gas, including a chamber, at least one gas inlet opening in the lower part of said chamber and at least one gas outlet opening in its upper part, a liquid-distributing system within said chamber, means for placing the liquid in direct contact with the gas, positioned under the distribution system, liquid receiving devices arranged under said contact means to collect the liquid falling therefrom in the form of droplets or the like, each said receiving device including a vertically inclined wall and a duct extending along the lower edge of the wall, said receiving devices being arranged substantially parallel to one another and slightly overlapping horizontally to prevent any liquid from the contacting means from dropping directly down into said chamber, characterized by the fact that each receiving device includes a splash-trapping panel positioned slightly above said inclined wall, and covering the major portion of its inclined surface, said panels consisting of vertical partitions delimiting passages therebetween, which are open in the vertical direction;

said receiving device further characterized by the fact that said panel is constituted by a criss-cross system of longitudinal partitions extending substantially parallel to said duct and by transverse partitions extending along the slope of said wall, that said partitions define a plurality of quadrangular structures each open at the top and bottom; that said panel projects beyond the lower edge of the wall and over said duct; and that a substantially vertical deflecting plate extends between the lower edge of the panel and a short distance from the bottom of the duct.

2. The device according to claim 1, further characterized by the fact that said panel projects beyond the lower edge of the wall and over said duct.

3. The device according to claim 1, further characterized by the fact that the upper edges of said partitions are constituted by thin ridges to prevent the splattering of the droplets of liquid falling onto said panel.

* * * * *